Aug. 20, 1968  T. H. BATZER ETAL  3,397,862
WEDGE GATE VACUUM VALVE MECHANISM WITH COATED SEAT SEAL
Filed Dec. 16, 1965

INVENTORS
THOMAS H. BATZER
CLEVE A. GUNDERSON
JOHN J. MURPHY
ATTORNEY

United States Patent Office 3,397,862
Patented Aug. 20, 1968

3,397,862
WEDGE GATE VACUUM VALVE MECHANISM WITH COATED SEAT SEAL
Thomas H. Batzer, Livermore, Cleve A. Gunderson, San Leandro, and John J. Murphy, Livermore, Calif., assignors to the United States of America as represented by the United States Atomic Energy Commission
Filed Dec. 16, 1965, Ser. No. 514,411
1 Claim. (Cl. 251—204)

ABSTRACT OF THE DISCLOSURE

A vacuum gate valve for sealing a port of large cross-sectional area in an ultra-high vacuum system, having a flat, circular seat surface surrounding the port, coated with a thin film of polymerized tetrafluoroethylene; a valve gate closure plate having an integral annularly inclined sealing surface which is bevelled toward the center of the gate to compensate for bending produced in the gate by a large, centrally applied loading force on the closure plate for engaging the inclined sealing surface of the plate against the coated, flat circular seat surface, which in turn produces a substantially flat, high integrity hermetic seal between valve gate and seat.

---

Figure 1:
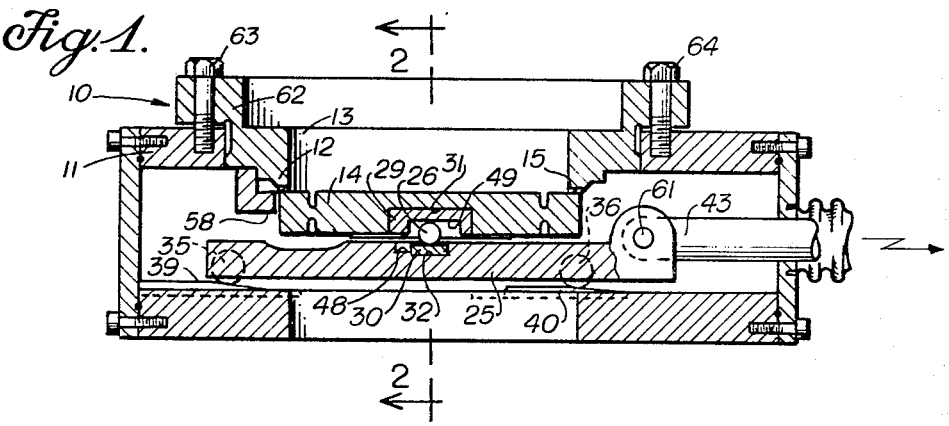

The invention described herein was made in the course of, or under, Contract W–7405–ENG–48 with the U.S. Atomic Energy Commission.

This invention relates to valve mechanisms and more particularly to valve mechanisms for use in ultra high vacuum systems.

Developments in a number of fields, and in particular controlled thermonuclear research, have required vacuum systems capable of producing vacuums approaching $10^{-11}$ As is well known in vacuum technology, methods used to accomplish such severe vacuum conditions generally incorporate a preliminary bake-out of the entire system to degas walls throughout the system, and a subsequent subjection of at least a portion of the system to extremely low temperatures due to the incorporation of a cold trap in the system. A typical range of temperatures to which at least portions of the vacuum system may be subjected would be from 77° K. to 673° K. It is generally impossible, or at least impractical, to isolate the valve mechanisms utilized in such systems from the temperature variations, and accordingly, the valves used must be able to withstand the severe temperature range without deterioration and, of course, provide the required seal or closed conductance. In the search for satisfactory valves for these vacuum systems, it early became apparent that the use of gaskets made from the usual materials was unsatisfactory since these materials deteriorated when subjected to the necessary temperature range, and thereafter failed to provide the required seal. Soft metal gaskets of aluminum or copper alloys have been utilized with some success, but these gaskets deform under the high pressures required for sealing, often making it necessary to readjust the valve stroke before each closure. The deformation of these gaskets also reduces their useful life thereby causing substantial maintenance of the valve. Gaskets of polymerized tetrafluoroethylene have also been tried, but these gaskets were found to be unsatisfactory. The unacceptably large leakage experienced with polymerized tetrafluoroethylene gaskets was apparently due to the tendency of this material to cold creep when subjected to the high sealing pressures necessary for vacuum operations.

Accordingly, an object of the invention is a valve structure that provides the required sealing although subjected to a wide temperature range. It is additionally an object of the invention that such valve may be reusable without adjustment of the valve stroke between closures, and that maintenance to the valve be minimal.

Briefly summarized, these and other objects are accomplished by providing a thin adherent coating of polymerized tetrafluoroethylene on the seating surface of a valve of the general type which has a valve seat defining a valve aperture and a valve gate coaxially mounted with respect to the seat for axial translation toward and away from the seat. More specifically, the gate is provided with an annular surface disposed for sealing engagement with the coated sealing surface, this annular surface being beveled toward its center axially away from the seating surface. Means are provided for translating the gate toward and away from the coated seating surface, preferably in a manner such that the loading force is transmitted substantially at the center point of the gate. This improved valve mechanism utilizing a coating of polymerized tetrafluoroethylene, as opposed to valves utilizing gaskets made from known materials including polymerized tetrafluoroethylene, has been found to provide reliable sealing in vacuum systems even after repeated subjection of the valve to the severe thermal cycling incident to high vacuum operations.

Figure 2:
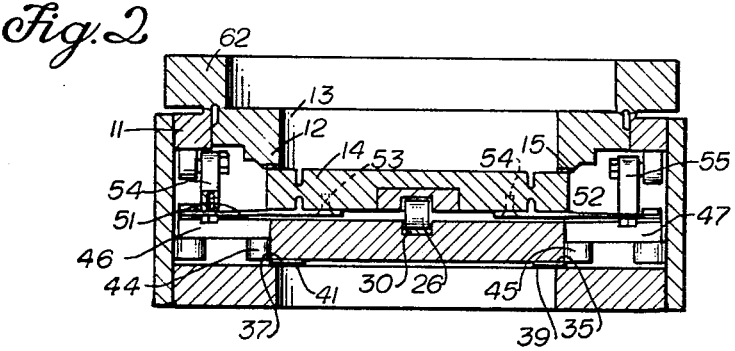
Figure 3:
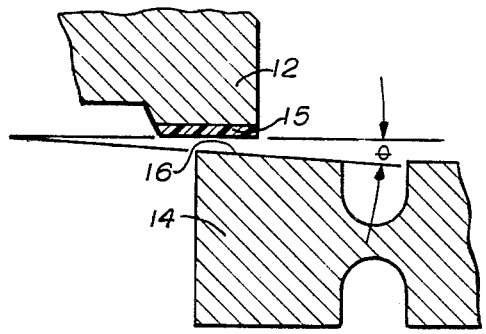

The above identified and additional objects and advantages will appear from the following description of one embodiment of the invention wherein FIG. 1 is a sectional front elevation of a valve mechanism in accordance with the invention; FIG. 2 is a sectional side elevation of the valve mechanism of FIG. 1; and FIG. 3 is an enlarged sectional view of a broken away portion of the valve of FIGS. 1 and 2, showing the details of the seat and gate arrangement thereof.

Referring now to FIGS. 1 and 2, the structure of valve 10 is basically composed of a valve housing 11 having a valve seat 12 defining valve aperture 13, a valve gate 14 coaxially mounted for axial movement toward and away from seat 12, and means including actuator 25 and roller 26 to effect the translation of gate 14 in a manner to be explained later. As shown in FIG. 3, a thin coating 15 of polymerized tetrafluoroethylene, available from the E. I. du Pont de Nemours & Co. under the trademark Teflon, is disposed on the seating surface of seat 12. It will be apparent that valve 10 is illustrated in the partially open relationship in FIG. 3 and that when the valve is closed, gate 14 makes sealing engagement with coated seating surface 15 through annular seat engaging or sealing surface 16.

It is preferred that coating 15 be quite thin—on the order of .0015 inch—although coating thicknesses of from .0005 to .004 inch can be utilized. Although applicants do not intend to be limited to any specific theory of operation, it is believed that the thickness of the coating need only be such as to completely cover over the very slight surface irregularities that occur on the seating surface of seat 12. The coating is also believed to provide a slightly yielding surface to compensate for the slight irregularities that occur in the sealing surface 16 of gate 14. The coating 15 may be applied by any choice of suitable methods known in the art. For instance, a suspension of polymerized tetrafluoroethylene can be sprayed onto the seating surface. Suitable suspensions for this purpose are marketed by E. I. du Pont de Nemours & Co.; one of these is identified by code No. 852–200. Adhesion of the coating to the seating surface can be improved by a prior application of a suitable primer such as E. I. du Pont de Nemours & Co. code No. 850–201. Better results can be obtained if the valve seat is preheated before application of the primer, and both primer and finish coats are given a subsequent baking cycle at 700–750° F. Coating 15 may also be applied by heat sealing a sheet of polymerized tetrafluoroethylene of the desired thickness to seat 12. After application of the coating by the chosen method, the surface may be smoothed out and leveled through a finish surfacing step utilizing a 600 grid surface plate.

Since the gate has a tendency to bend when it is fully loaded, seating surface 16 of gate 14 is beveled toward its center and axially away from seat 12 at an angle $\phi$ to provide surface contact between the gate and the seat at the required gate load. The optimum size of angle $\phi$ may vary from about 1° to about 2½° depending upon the size of the valve and the material from which the gate is made. A bevel angle $\phi$ of about 1° is typical for a steel gate of about 6" in diameter. It is greatly preferred that the gate 14 be suspended and actuated in a manner which allows for an even pressure distribution over seat engaging surface 16. This may be accomplished by applying the loading force at the center of the gate through what approximates substantially a point application. A preferred combination of means by which this preferential loading may be accomplished is illustrated in FIGS. 1 and 2 wherein the various parts are shown in the positions they will assume when the valve is fully closed. The loading force is transmitted to gate 14 from actuator 25 through center roller 26 disposed between gate 14 and actuator 25. Hardened metal inserts 29 and 30 in cavities 31 and 32 of the gate and actuator respectively, are provided to minimize wear. The loading force is transmitted to roller 26 from actuator 25 through these hardened inserts by the movement of the actuator upwardly toward the rear of gate 14. The movement of actuator 25 in this direction is accomplished by the advance of four rotatably mounted rollers, three of which 35, 36 and 37, are represented in the figure, up inclined surfaces 39, 40, 41 and one not shown, in response to the movement of actuator rod 43 to the left as viewed in FIG. 1. The fourth roller and its corresponding inclined surface are, of course, identical in operation to those illustrated. The alignment of actuator 25 during movement is assured by the action of the rollers 44, 45 of guide assemblies 46 and 47. Actuator rod 43 is connected to actuator 25 by any suitable means such as pin 61, and in turn is connected to a suitable source of linear motion such as a fluid pressure motor, not shown.

It will be understood from a perusal of FIG. 1 that when actuator rod 43 is moved to the right as shown therein, the four rollers, including 35, 36 and 37, proceed down their corresponding inclined surfaces, thereby lowering actuator 25 and removing the pressure from roller 26. Upon further movement of rod 43 and actuator 25 toward the right, relieved portion 48 of cavity 32 will become aligned with roller 26, thereby further removing pressure from the roller and permitting roller 26 to move to the right until it is positioned in the enlarged cavity formed by relieved portions 48 and 49. When roller 26 is positioned in the cavity formed by relieved portions 48 and 49, leaf springs 51 and 52, fastened to gate 14 by screws 53 and 54, force gate 14 out of engagement with seat 12 thereby opening the valve. It can be seen that springs 51 and 52, which are fastened to housing 11 through suspension assemblies 54 and 55, mount gate 14 coaxially with respect to seat 12 for axial movement toward and away from seat 12. Stop 58 maintains the axial alignment of the gate to insure that the motion of gate 14 towards seat 12 is in fact in the axial direction.

As shown in FIG. 1, seat 12 may be formed on removable member 62 to provide ready access to the various components of the valve, and may be fastened to housing 11 by bolts 63 and 64.

Valve mechanisms in accordance with the invention as illustrated by the foregoing description of a preferred embodiment thereof have proven extremely useful in ultra high vacuum applications in that they have been found to overcome various limitations of known valves utilizing gaskets made from known materials as explained above. It will be understood that various changes, rearrangements and/or omissions in the details, materials, and arrangements of parts which have herein been described and illustrated in order to explain the nature of the invention, may be made by those skilled in the art within the principle and scope of the invention as expressed in the appended claim.

What we claim is:

1. A bakeable, reusable, high vacuum valve, comprising an annular seat defining a valve aperture, said annular seat being coated with a polymerized tetrafluoroethylene film on the order of 0.0005 to 0.004 inch thick; a valve gate coaxially mounted for movement toward and away from said seat, said valve gate defining a sealing surface adapted to mate with said valve seat; and means for forcefully loading said valve gate with a loading force substantially at the center point thereof for compressive engagement of said sealing surface and said seat, said sealing surface of said valve gate being bevelled toward the center of said gate at an angle corresponding to the degree of bending of said gate produced by said loading force.

References Cited

UNITED STATES PATENTS

| | | | |
|---|---|---|---|
| 2,869,819 | 1/1959 | Rucker | 251—328 X |
| 3,038,692 | 6/1962 | Holmes | 251—204 X |
| 3,112,095 | 11/1963 | Batzer | 251—204 X |
| 3,182,954 | 5/1965 | Borger | 251—328 X |
| 3,237,915 | 3/1966 | Palmer | 251—158 |
| 3,352,535 | 11/1967 | Power | 251—204 |

FOREIGN PATENTS 64,323   6/1955   France.

CLARENCE R. GORDON, *Primary Examiner.*